(12) United States Patent
Donnellan et al.

(10) Patent No.: US 7,775,537 B2
(45) Date of Patent: Aug. 17, 2010

(54) INGRESS/EGRESS STEPS FOR A HIGHWAY TRUCK

(75) Inventors: Aubrey C. Donnellan, Redondo Beach, CA (US); Raphael Rogman, Houston, TX (US); Victor Soto, Miami, FL (US); Neil Stegall, Pittsburgh, PA (US); Caitlin Travers, Pittsburgh, PA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 457 days.

(21) Appl. No.: 11/952,735

(22) Filed: Dec. 7, 2007

(65) Prior Publication Data

US 2008/0169623 A1  Jul. 17, 2008

Related U.S. Application Data

(60) Provisional application No. 60/883,191, filed on Jan. 3, 2007.

(51) Int. Cl.
B60R 3/02 (2006.01)

(52) U.S. Cl. .................. 280/166; 280/163

(58) Field of Classification Search .......... 280/763.1, 280/163, 164.1, 164.2, 165, 166, 169; 180/90.6; 296/62
See application file for complete search history.

(56) References Cited

U.S. PATENT DOCUMENTS

| | | | | |
|---|---|---|---|---|
| 1,253,569 A | * | 1/1918 | Beard ........................ | 105/448 |
| 1,542,113 A | | 6/1925 | Vogel | |
| 3,171,671 A | | 3/1965 | Cornett | |
| 3,394,947 A | | 7/1968 | Strube, Sr. | |
| 3,528,574 A | * | 9/1970 | Denner et al. .............. | 414/558 |
| 3,930,755 A | | 1/1976 | Lahr et al. | |
| 3,955,827 A | * | 5/1976 | Wonigar .................... | 280/166 |
| 4,102,432 A | * | 7/1978 | Bustin ...................... | 182/92 |
| 4,126,350 A | | 11/1978 | Briers et al. | |
| 4,168,134 A | * | 9/1979 | Pohl ......................... | 414/545 |
| 4,185,849 A | | 1/1980 | Jaeger | |
| 4,200,303 A | | 4/1980 | Kelly | |
| 4,231,583 A | | 11/1980 | Learn | |
| 4,264,084 A | * | 4/1981 | Telles ....................... | 280/166 |
| 4,326,750 A | | 4/1982 | Rosenbaum | |
| 4,356,894 A | | 11/1982 | Everett | |
| 4,570,962 A | | 2/1986 | Chavira | |
| 4,842,325 A | | 6/1989 | Irelan | |
| 4,865,349 A | | 9/1989 | Church, Jr. | |
| 4,925,235 A | * | 5/1990 | Fingerle .................... | 296/180.2 |
| 4,991,906 A | * | 2/1991 | Fingerle .................... | 296/180.2 |
| 5,054,799 A | * | 10/1991 | Fingerle .................... | 280/164.1 |
| 5,085,450 A | | 2/1992 | DeHart, Sr. | |
| 5,375,864 A | | 12/1994 | McDaniel | |
| 5,505,476 A | * | 4/1996 | Maccabee ................. | 280/166 |

(Continued)

Primary Examiner—Glenn Dayoan
Assistant Examiner—Jacob Meyer
(74) Attorney, Agent, or Firm—Jeffrey P. Calfa; Mark C. Bach

(57) ABSTRACT

A truck cab has a side door (14) via which a person enters and exits the cab by ascending and descending steps (22, 24, 26; 40, 42, 44) on a side of the truck. At least one of the steps is selectively positionable to a deployed position for use by a person ascending or descending the steps and to a non-deployed position when the truck is to be driven. The deployed position is relatively more outboard on the side of the truck than the non-deployed position.

4 Claims, 4 Drawing Sheets

U.S. PATENT DOCUMENTS

| | | | |
|---|---|---|---|
| 5,538,265 A * | 7/1996 | Chen et al. | 280/163 |
| 5,584,493 A * | 12/1996 | Demski et al. | 280/166 |
| 5,593,167 A * | 1/1997 | Barnhardt et al. | 280/164.1 |
| 5,944,332 A | 8/1999 | Lee et al. | |
| 6,029,989 A * | 2/2000 | Stuart et al. | 280/163 |
| 6,053,533 A * | 4/2000 | Osborn et al. | 280/830 |
| 6,076,844 A * | 6/2000 | Stuart et al. | 280/163 |
| 6,082,751 A * | 7/2000 | Hanes et al. | 280/163 |
| 6,099,007 A * | 8/2000 | Stuart et al. | 280/163 |
| 6,152,470 A * | 11/2000 | Stuart et al. | 280/163 |
| 6,178,364 B1 | 1/2001 | Delurey et al. | |
| 6,179,312 B1 | 1/2001 | Paschke et al. | |
| 6,213,486 B1 * | 4/2001 | Kunz et al. | 280/166 |
| 6,264,222 B1 * | 7/2001 | Johnston et al. | 280/166 |
| 6,347,678 B1 * | 2/2002 | Osborn et al. | 180/68.5 |
| 6,659,224 B2 * | 12/2003 | Medsker | 182/91 |
| 6,810,979 B2 * | 11/2004 | Johansson et al. | 180/69.21 |
| 6,926,295 B2 | 8/2005 | Berkebile et al. | |
| 7,234,716 B2 | 6/2007 | Stevenson | |
| 7,637,563 B2 * | 12/2009 | Plett et al. | 296/198 |
| 2003/0071434 A1 * | 4/2003 | Budd | 280/166 |
| 2004/0232649 A1 * | 11/2004 | Lambie | 280/163 |

* cited by examiner

INGRESS/EGRESS STEPS FOR A HIGHWAY TRUCK

REFERENCE TO RELATED APPLICATION AND PRIORITY CLAIM

This application claims the priority of Provisional Patent Application No. 60/883,191, filed on Jan. 3, 2007, the entire content of which is incorporated herein by reference.

FIELD OF THE INVENTION

This invention relates to ingress/egress steps that a driver or passenger uses to enter and exit the cab of a highway truck through a side door of the cab.

BACKGROUND OF THE INVENTION

A highway truck typically has a cab that is high enough off the ground to require one or more steps for enabling a person to climb into and out of the cab through an open side door of the cab. An example of such steps comprises one or more steps that are mounted on a cylindrical fuel tank that is mounted on a chassis frame of the truck below the side door.

The inventors have discovered through various means, including interviews with professional truckers, that for various reasons, the steps in certain trucks are considered by a significant number of truckers to be difficult or inconvenient to use.

In general it is not possible for a person to climb truck steps as if they were part of a home or building staircase because of the large rise from ground level to cab floor level that occurs over a short horizontal distance, i.e. large rise angle.

A person climbing truck steps may be required to exert significant strength over extended and/or uncustomary ranges of body motion because the climbing motion is sometimes more like climbing a ladder than a set of stairs. For example, the process may require a person to pivot his/her body under awkward conditions. One or more handgrips can be used as climbing aids, but for various reasons they may be absent or if present, they may not be at optimal locations. In general, difficulty in climbing truck steps increases with a person's age. Older persons may have balance problems and also greater difficulty in seeing the steps, especially under low ambient light. Slips and falls are unfortunately always a risk when anyone climbs or descends any stairs.

The steps of a large truck are themselves constantly exposed to the elements. The effects of weather, i.e., ice, snow, etc., are also a factor in climbing and descending steps.

Consequently, it is believed that improvements that would facilitate a person's ingress to and egress from a highway truck are desirable.

SUMMARY OF THE INVENTION

The present invention relates to such improvements and provides several embodiments of steps that are characterized by a smaller rise angle that is present in typical highway trucks.

A preferred embodiment comprises a set of three steps, rather than the two steps that are typical of production highway trucks. In order to achieve the objective of a smaller rise angle without increasing the overall width of the truck as measured between the most outboard steps on each side when the truck is being driven on a highway, at least one of the steps is constructed and arranged to be selectively positionable, either in whole or in part. In a deployed position for allowing comfortable ingress and egress, at least one step is placed in a more outboard position. In a non-deployed position for highway travel, such a step is placed in a more inboard position.

In providing ease of ingress and egress, it is important that the depths of the individual steps be kept large enough to provide a surface on which a substantial portion of a person's foot can be conveniently placed. In other words, the steps should provide more than just a toehold for a person's foot.

In a preferred embodiment of the invention as applied to replace a set of two steps in a particular production truck, the rise angle is more ergonomic, approximately 69°, when the set of steps of the preferred embodiment is in the deployed position, a significant reduction from the rise angle of approximately 82.3° for the prior two-step design. That preferred embodiment has a maximum rise between the steps of approximately 10.88", a reduction from a prior dimension of approximately 18.5" in the two-step design.

The selective positioning of at least one step is preferably accomplished by an actuator that moves an entire step, or some portion of a step, between deployed and non-deployed positions. Operation of the actuator can be performed by a person entering or exiting the cab, or can occur automatically when one or more particular conditions are satisfied. For example, deployment can occur when the parking brake is applied, with non-deployment occurring when the parking brake is released.

One generic aspect of the invention relates to a truck comprising a cab having a side door via which a person enters and exits the cab by ascending and descending steps on a side of the truck. At least one of the steps is selectively positionable to a deployed position for use by a person ascending or descending the steps and to a non-deployed position when the truck is to be driven. The deployed position is relatively more outboard on the side of the truck than the non-deployed position.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
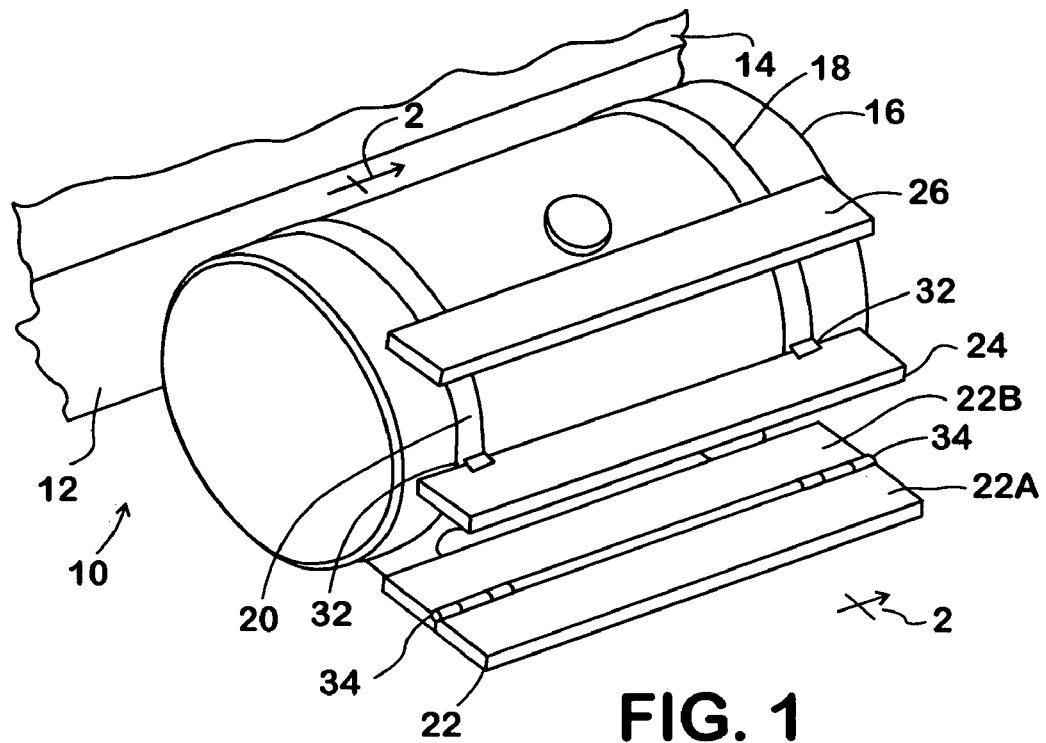
FIG. 1 is a perspective view showing the deployed position of a first embodiment of ingress/egress steps in accordance with principles of the invention.
Figure 2:
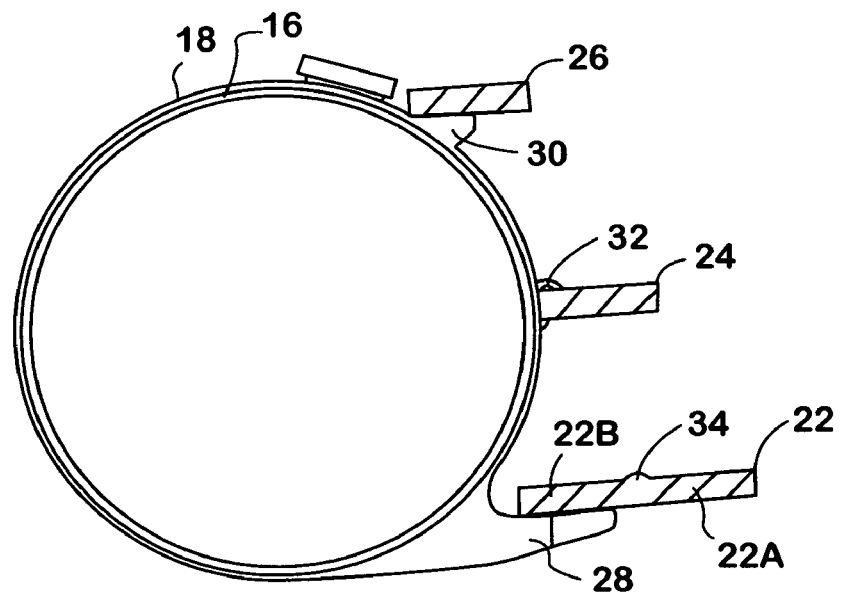
FIG. 2 is a transverse cross section view in the direction of arrows 2-2 in FIG. 1.
Figure 3:
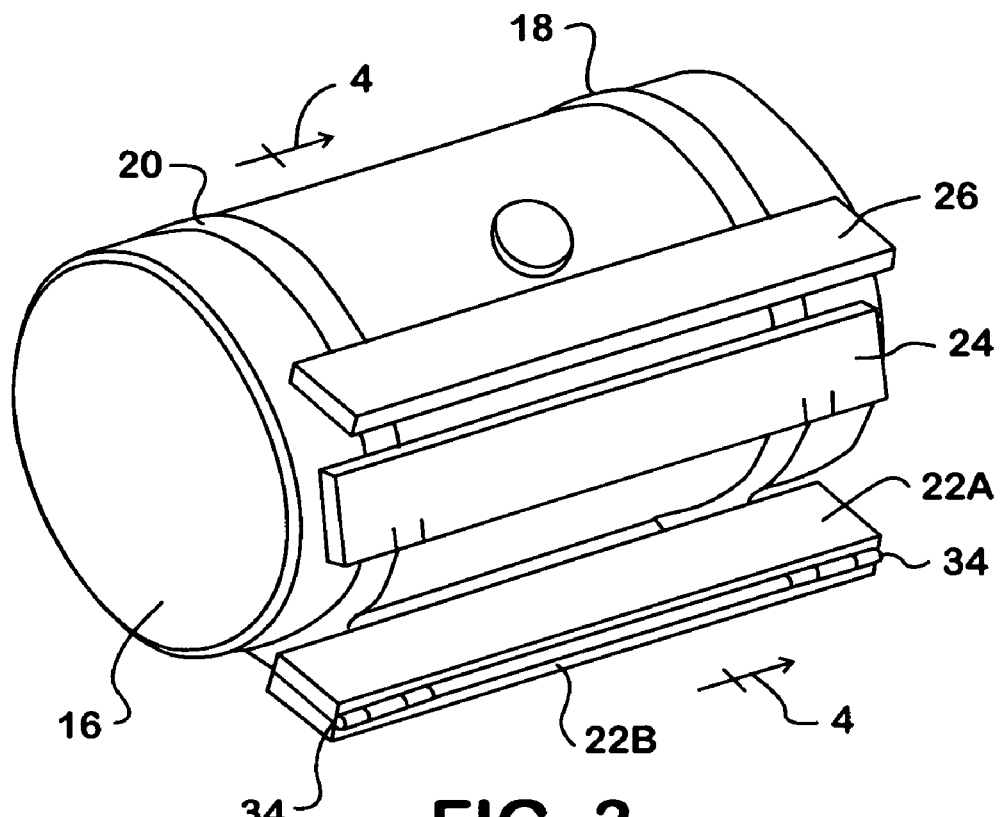
FIG. 3 is a perspective view showing the non-deployed position of the first embodiment of ingress/egress steps.
Figure 4:
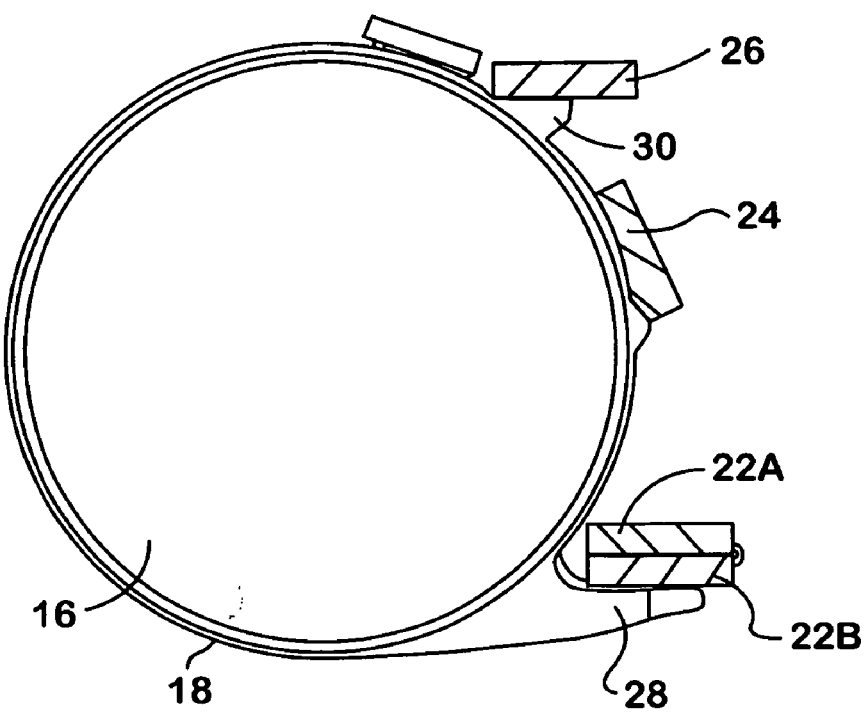
FIG. 4 is a transverse cross section view in the direction of arrows 4-4 in FIG. 3.

FIGS. 1-4 show a portion of a large highway truck 10 that is located below the cab on the driver's side, specifically the left side. The truck has a chassis frame 12 that supports the cab. The cab has a driver's side door 14 that opens and closes to allow driver ingress to and egress from the cab. A side mount fuel tank 16 is attached to frame 12 by bands 18 and 20 that girdle the cylindrical side wall of the tank inwardly of the tank end walls.

FIGS. 1-4 further show a set of three steps 22, 24, 26 that provide driver ingress to and egress from the cab when door 14 is open. In accordance with general principles of the invention, at least one of the steps is selectively positionable to a deployed position for use by the driver when ascending or descending the steps and to a non-deployed position when truck 10 is to be driven. In this embodiment of the invention, both the lowermost step 22 and the next lowermost step 24 are selectively positionable, while the uppermost step 26 is stationarily mounted.

Step 22 comprises two rectangular slats 22A and 22B of substantially equal size. Slat 22B is an inboard slat fixedly mounted on generally horizontal ledges 28 that protrude from bands 18 and 20. Slat 22A is arranged to move relative to slat 22B between the non-deployed position shown in FIGS. 3 and 4 in which the two slats substantially overlap each other and the deployed position shown in FIGS. 1 and 2 in which slat 22A is disposed outboard of and in substantially flush horizontal alignment with slat 22B. The movement is provided by hinges 34 that connect the slats together as shown.

Step 24 comprises a single slat that is connected to bands 18 and 20 by respective aligned hinges 32. Step 24 is selectively positionable by swinging about the axis of hinges 32 more than 90° inboard (somewhere around 110° to 115°) relative to tank 16 from the generally horizontal deployed position shown in FIGS. 1 and 2 to the horizontally inclined non-deployed position shown in FIGS. 3 and 4.

Step 26 comprises a single rectangular slat that is mounted on generally horizontal ledges 30 that protrude from bands 18 and 20.

When the set of steps are deployed, they have a rise angle no greater than about 70°. When the set of steps are not deployed, the outboardmost lower step 22, is within an envelope of acceptable truck width for highway travel.

Preferably, the steps are operated between deployed and non-deployed positions by a prime mover that is not specifically shown in the drawing. The operative coupling of the prime mover to the movable elements of the set of steps can serve to keep the steps deployed when placed in deployed position and to keep the steps non-deployed when placed in non-deployed position. Because the steps are exposed to road and weather, the prime mover and moving parts are protected for ensuring reliable operation over a full range of anticipated environmental conditions.

FIGS. 5-8 also show a portion of a large highway truck below the cab on the driver's side. A side mount fuel tank 16 is attached to the chassis frame (not shown in FIGS. 5-8) by bands 18 and 20 that girdle the nominally cylindrical side wall of the tank inwardly of the tank end walls.

FIGS. 5-8 further show a set of three steps 40, 42, 44 that provide driver ingress to and egress from the cab when the driver's side door is open. In accordance with general principles of the invention, at least one of the 40, 42, 44 steps is selectively positionable to a deployed position for use by the driver when ascending or descending the steps and to a non-deployed position when the truck is to be driven. In this embodiment of the invention, only the lowermost step 40 is selectively positionable, while the two other steps 42 and 44 are stationarily mounted.

The nominally cylindrical side wall of tank 16 comprises an outboard facing indentation 45 that endows the side wall with a generally horizontal ledge 46 at approximately mid-height of the tank and a generally vertical back 48 extending upward at the back of the ledge. The indentation spans about 40° of the circumference of the tank side wall.

Where back 48 joins the cylindrical portion of the tank side wall, ledges 50 are disposed on bands 18 and 20. Step 44 is stationarily mounted on ledges 50. Step 42 is stationarily mounted on ledge 46.

Bands 18 and 20 have additional formations 52 to which a four-bar parallelogram linkage mechanism 54 is attached. Step 40 forms one side of the four-bar parallelogram linkage mechanism. The side of the linkage opposite step 40 is formed by a portion of a bar 60, shown as a rectangular tube, via which links 56, 58 that form the remaining two sides of the mechanism couple the bar and step 40. Links 56, 58 are coupled at one end to bar 60 by respective pivot joints 62 that have vertical axes allowing the links to swing horizontally. At their opposite ends, links 56, 58 are coupled to step 40 by respective pivot joints 64 that have vertical axes allowing the links to turn horizontally relative to step 40. The pivot joints underlie step 40 so that they don't interfere with a person's foot stepping onto the step.

The portion of bar 60 between pivot joints 62 defines a fixed length for a long side of the parallelogram linkage. The portion of step 40 between pivot joints 64 defines an identical length for the opposite side. In the deployed position shown in FIGS. 5 and 6, links 56, 58 assume substantial perpendicularity to both bar 60 and step 40. If one of the links is swung to the left as viewed in FIG. 5, the nature of the linkage causes both links to swing in unison. Step 40 is constrained to follow the arcs along which the underlying pivot joints 64 swing and remains parallel with bar 60 as the parallelogram collapses. The swinging motion is arrested when the step assumes the non-deployed position of FIGS. 7 and 8.

Link 58 is swung by an actuator 66, shown as a fluid cylinder. One end of the cylinder housing is attached by a pivot joint 68 to bar 60. An extensible/retractable rod 70 protrudes from the opposite end. The distal end of rod 70 is attached to the underside of link 58 via a pivot joint 72 located toward the outboard end of the link.

Figure 5:
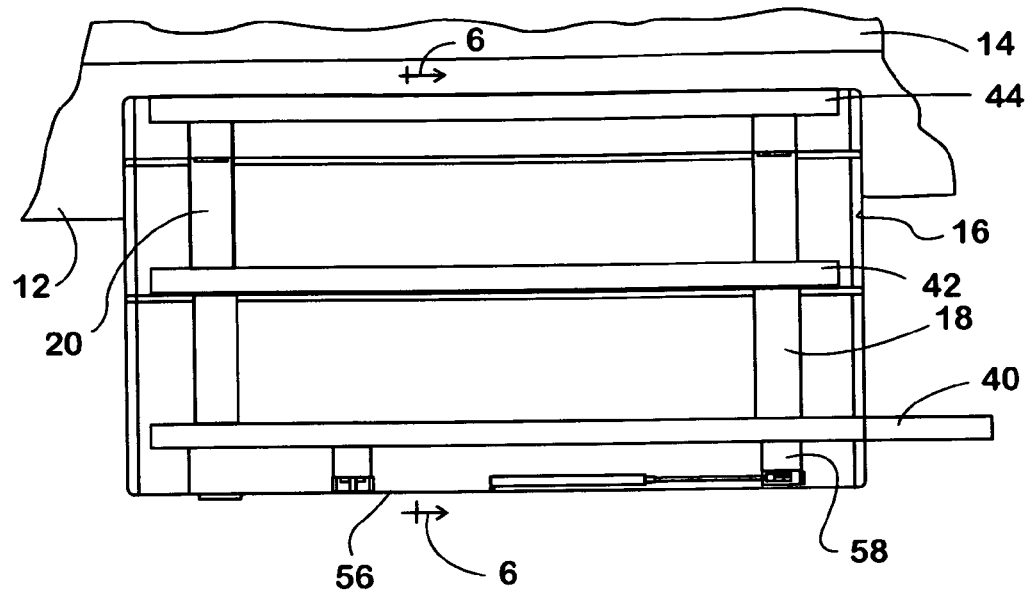
FIG. 5 is a side elevation view showing the deployed position of a second embodiment of ingress/egress steps in accordance with principles of the invention.
Figure 6:
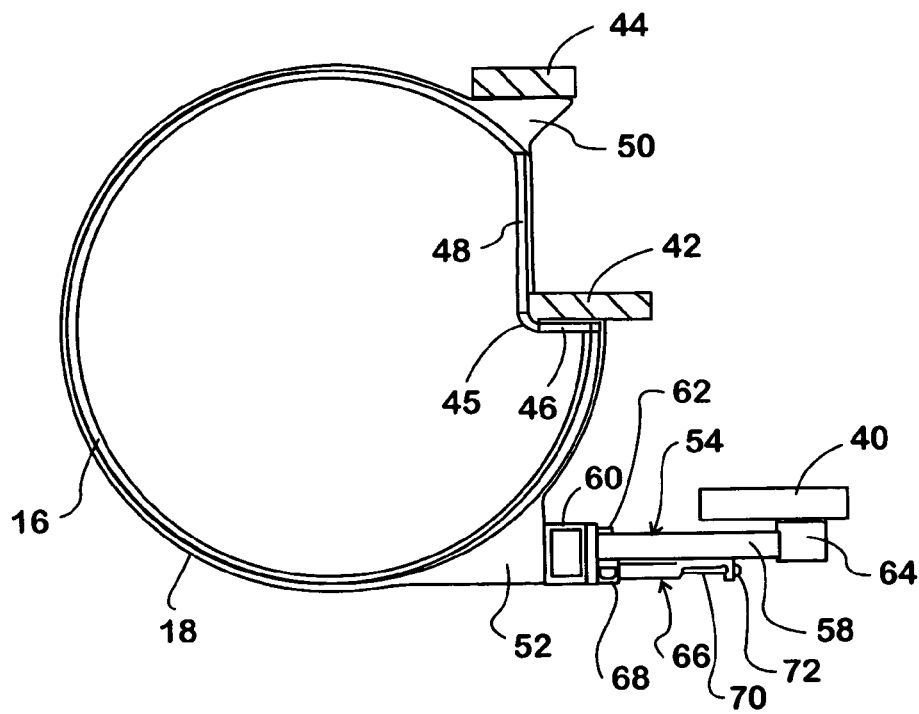
FIG. 6 is a transverse cross section view in the direction of arrows 6-6 in FIG. 5.

In the deployed position shown in FIGS. 5 and 6, rod 70 is maximally extended. When actuator 66 is operated to retract the rod, the rod pulls on link 58 to create a torque about the respective pivot joint 62 to swing the step toward non-deployed position.

Figure 7:
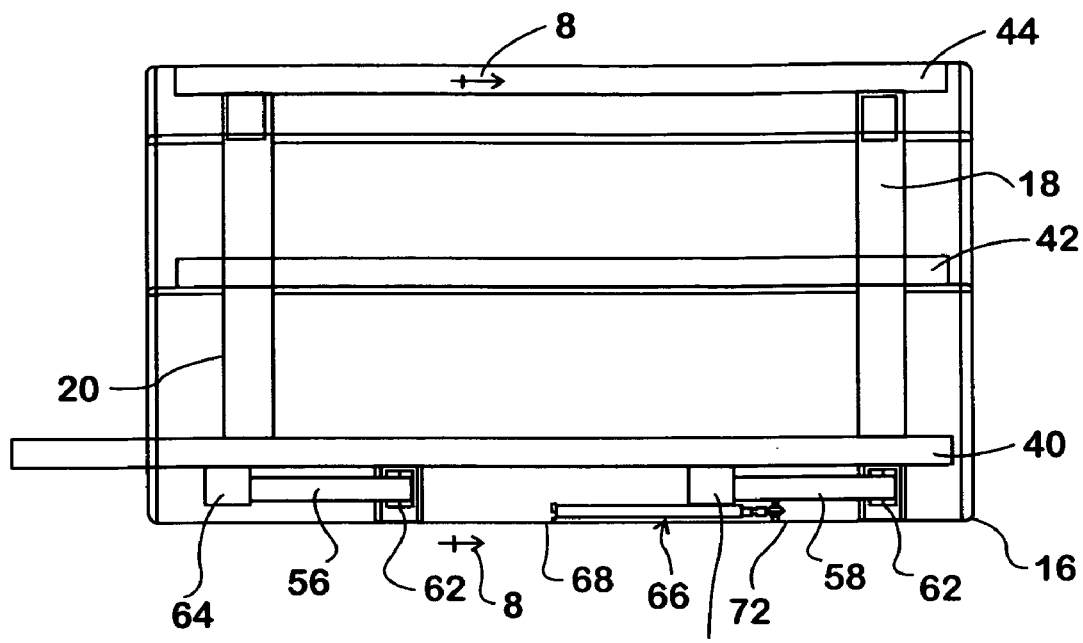
FIG. 7 is a side elevation view showing the non-deployed position of the second embodiment of ingress/egress steps.
Figure 8:
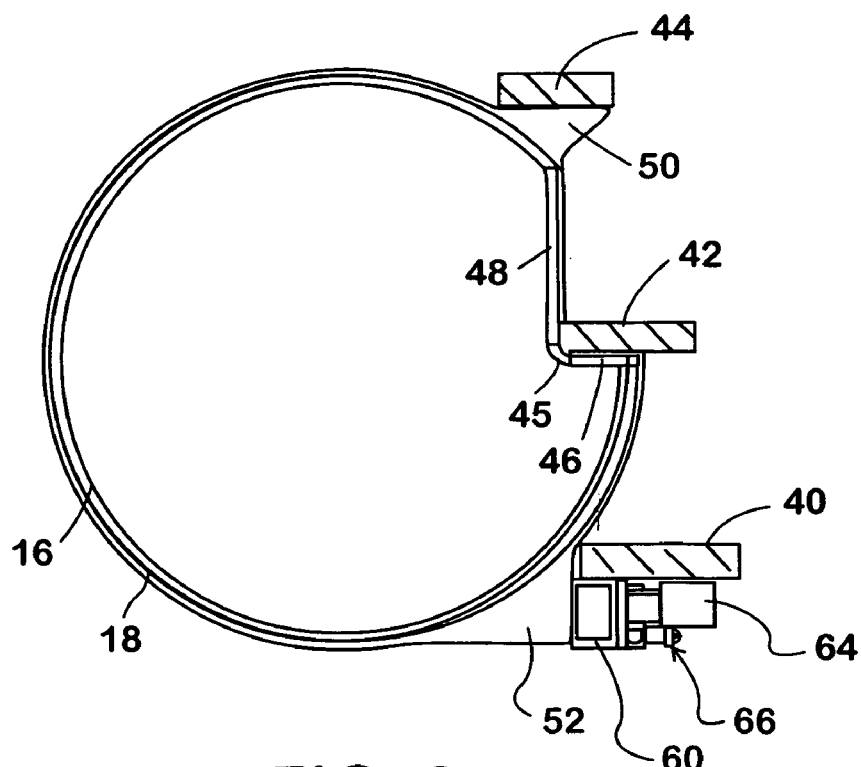
FIG. 8 is a transverse cross section view in the direction of arrows 8-8 in FIG. 7.

In the non-deployed position shown in FIGS. 7 and 8, rod 70 is maximally retracted. When actuator 66 is operated to extend the rod, the rod pushes on link 58 to create a torque about the respective pivot joint 62 to swing the step toward deployed position.

The arrangement of the steps in each of the two embodiments provides at least some access to each step when the steps are in non-deployed position, allowing the steps to be used should they fail to deploy, even if the access to some is only a toehold.

While a presently preferred embodiment of the invention has been illustrated and described, it should be appreciated that principles of the invention apply to all embodiments falling within the scope of the following claims.

What is claimed is:

1. A truck comprising:

a cab having a side door via which a person enters and exits the cab by ascending and descending steps on a side of the truck, wherein at least one of the steps is selectively positionable to a deployed position for use by a person ascending or descending the steps and to a non-deployed position when the truck is to be driven, the deployed position being relatively more outboard on the side of the truck than the non-deployed position; wherein the steps are mounted on a chassis frame of the truck via a tank that is mounted on the chassis frame; wherein the steps comprise an ascending succession of three steps, a) a first of the steps being the lowest of the three and arranged to be selectively positionable to deployed and non-deployed positions, b) a second of the three steps being higher than the first step but lower than a third of the three steps, the second step being selectively positionable by swinging more than 90° inboard relative to the tank from a generally horizontal deployed position to a horizontally inclined non-deployed position, and c) the third step being disposed in a generally horizontal position; wherein the first step comprises two slats, one of which is an inboard slat fixedly mounted on the tank and the other slat is arranged to move relative to the one slat between a non-deployed position in which the two slats substantially overlap each other and a deployed position in which the other slat is disposed outboard of, and in horizontal alignment with, the one slat.

2. A truck as set forth in claim 1 wherein the rise angle of the steps is no greater than about 70° in the deployed position.

3. A truck as set forth in claim 1 further including a prime mover for moving the steps between deployed and non-deployed positions.

4. A truck as set forth in claim 1 wherein the third step is stationarily mounted on the tank that is mounted on the chassis frame of the truck.

* * * * *